US009999062B1

(12) United States Patent
Sadiq et al.

(10) Patent No.: US 9,999,062 B1
(45) Date of Patent: Jun. 12, 2018

(54) CHANNEL FEEDBACK PRECEDING DOWNLINK DATA TRANSMISSIONS IN CELLULAR IOT SYSTEMS

(71) Applicant: QUALCOMM Incorporated, San Diego, CA (US)

(72) Inventors: Bilal Sadiq, Basking Ridge, NJ (US); Junyi Li, Chester, NJ (US); Xiao Feng Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/886,650

(22) Filed: Feb. 1, 2018

Related U.S. Application Data

(62) Division of application No. 15/007,094, filed on Jan. 26, 2016, now Pat. No. 9,924,525.

(Continued)

(51) Int. Cl.
*H04W 72/00* (2009.01)
*H04W 72/08* (2009.01)
(Continued)

(52) U.S. Cl.
CPC ......... *H04W 72/085* (2013.01); *H04L 1/0026* (2013.01); *H04L 1/0027* (2013.01);
(Continued)

(58) Field of Classification Search
None
See application file for complete search history.

(56) References Cited

U.S. PATENT DOCUMENTS 8,374,145 B2 2/2013 Yoon et al.
9,144,080 B2 9/2015 Sarkar et al.
(Continued)

FOREIGN PATENT DOCUMENTS

WO 2009096698 A2 8/2009

OTHER PUBLICATIONS

Ericsson: "Relaxed Reporting for MTC," 3GPP Draft; R1-150016 Relaxed Reporting for MTC, 3rd Generation Partnership Project (3GPP), Mobile Competence Centre ; 650, Route Des Lucioles ; F-06921 Sophia-Antipolis Cedex ; France vol. RAN WG1, No. Athens, Greece; 20150209-20150213 Jan. 31, 2015 (Jan. 31, 2015), XP050948782, Retrieved from the Internet: URL:http://www.3gpp.org/ftp/tsg_ran/WG1_RL 1/TSGR1 80/Docs/ [retrieved on Jan. 31, 2015].

(Continued)

*Primary Examiner* — Suhail Khan
(74) *Attorney, Agent, or Firm* — Clint R. Morin; Arent Fox, LLP

(57) ABSTRACT

A method, an apparatus, and a computer-readable medium for wireless communication are provided. The apparatus may be a base station. The apparatus may transmit a message to a user equipment (UE). The message may indicate a first dedicated resource for downlink transmission, and the first dedicated resource may be associated with a scheduled downlink transmission from the apparatus. The apparatus may receive an information message from the UE on a second dedicated resource for uplink transmission based on the first dedicated resource for downlink transmission indicated in the message. The information message may be used for transmitting the scheduled downlink channel transmission that was scheduled before the information message was received. The apparatus may transmit the scheduled downlink transmission after receiving the information message (Continued)

from the UE. The scheduled downlink transmission may be based on the received information message.

12 Claims, 8 Drawing Sheets

Related U.S. Application Data

(60) Provisional application No. 62/120,863, filed on Feb. 25, 2015.

(51) Int. Cl.
*H04L 1/00* (2006.01)
*H04W 52/18* (2009.01)
*H04W 72/12* (2009.01)

(52) U.S. Cl.
CPC ............. *H04W 4/70* (2018.02); *H04W 52/18* (2013.01); *H04W 72/1205* (2013.01); *H04W 72/1273* (2013.01)

(56) References Cited

U.S. PATENT DOCUMENTS

| | | |
|---|---|---|
| 2008/0146215 A1 | 6/2008 | Oota |
| 2009/0109912 A1 | 4/2009 | DiGirolamo et al. |
| 2014/0204856 A1 | 7/2014 | Chen et al. |
| 2014/0341093 A1 | 11/2014 | Seo et al. |
| 2016/0249368 A1 | 8/2016 | Sadiq et al. |
| 2016/0309453 A1* | 10/2016 | Quan ................ H04W 72/0446 |

OTHER PUBLICATIONS

International Search Report and Written Opinion—PCT/US2016/019387—ISA/EPO—dated Jun. 1, 2016.
Qualcomm Incorporated: "Power Consumption Reduction," 3GPP Draft; R1-150463 Power Consumption Reduction, 3rd Generation Partnership Project (3GPP), Mobile Competence Centre ; 650, Route Des Lucioles ; F-06921 Sophia-Antipolis Cedex ; France vol. RAN WG1, No. Athens, Greece; 20150209-20150213 Feb. 8, 2015 (Feb. 8, 2015), XP050933671, Retrieved from the Internet: URL:http://www.3gpp.org/ftp/Meetings_3GPP_SYNC/RAN1/Docs/ [retrieved on Feb. 8, 2015],4 pages.

\* cited by examiner

CHANNEL FEEDBACK PRECEDING DOWNLINK DATA TRANSMISSIONS IN CELLULAR IOT SYSTEMS

CROSS-REFERENCE TO RELATED APPLICATION(S)

This application is a Divisional Application of Non-Provisional U.S. application Ser. No. 15/007,094 filed on Jan. 26, 2016, which claims the priority benefit of U.S. Provisional Application Ser. No. 62/120,863, entitled "CHANNEL FEEDBACK PRECEDING DOWNLINK DATA TRANSMISSIONS IN CELLULAR IOT SYSTEMS" and filed on Feb. 25, 2015. Both the non-provisional parent application and the provisional application are expressly incorporated by reference herein in their entirety.

BACKGROUND

Field

The present disclosure relates generally to communication systems, and more particularly, to channel feedback preceding downlink data transmission in cellular Internet of Things (IoT) systems.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer-readable medium, and an apparatus are provided. The apparatus may be a user equipment (UE). The apparatus receives a message from a base station. The message may indicate a first dedicated resource for downlink transmission, and the first dedicated resource may be associated with a scheduled downlink transmission from the base station. The apparatus may determine a second dedicated resource for uplink transmission based on the first dedicated resource for downlink transmission indicated in the message, and the second dedicated resource for uplink transmission may be associated with the scheduled downlink transmission. The apparatus may determine whether to transmit an information message, to be used by the base station for transmitting the scheduled downlink transmission, on the second dedicated resource.

An aspect of the disclosure provides for an apparatus for wireless communication. The apparatus may include means for receiving a message from a base station. The message may indicate a first dedicated resource for downlink transmission, and the first dedicated resource may be associated with a scheduled downlink transmission from the base station. The apparatus may include means for determining a second dedicated resource for uplink transmission based on the first dedicated resource for downlink transmission indicated in the message. The second dedicated resource for uplink transmission may be associated with the scheduled downlink transmission. The apparatus may include means for determining whether to transmit an information message, to be used by the base station for transmitting the scheduled downlink transmission, on the second dedicated resource. In one configuration, the means for determining whether to transmit the information message may be configured to measure a channel condition between the apparatus and the base station before the base station transmits the scheduled downlink transmission associated with the message, in which the measurement may be triggered based on the reception of the message indicating the first dedicated resource for downlink transmission. In this configuration, the means for determining whether to transmit may be further configured to refrain from transmitting the information message to the base station if the apparatus expects to be able to decode a current modulation and coding scheme (MCS) used by the base station, the apparatus does not expect to be able to decode the current MCS used by the base station if a transmission power used by the base station is decreased beyond a threshold, and the apparatus does not expect to decode a greater MCS. In another configuration, the apparatus may be configured to transmit the information message to the base station on the second dedicated resource before the base station transmits the scheduled downlink transmission. In another aspect, the information message may include a transmit power or a transmit power correction factor, and the transmit power or the transmit power correction factor may be based on a channel condition between the apparatus and the base station. In another aspect, the information message may include an MCS index or an MCS index correction factor, and the MCS index or the MCS index correction factor may be based on a channel condition between the apparatus and the base station. In another aspect, the information message may include a channel measurement report that includes a channel quality index (CQI) or a CQI correction factor associated with a known CQI. The CQI or the CQI correction factor may be based on a channel condition between the apparatus and the base station. In another aspect, the information message may include a reference signal. In another configuration, the apparatus may include means for receiving the scheduled downlink transmission from the base station. The scheduled downlink transmission may be received based on the information message transmitted to the base station using the second dedicated resource or is received based on a previously transmitted information message. In another aspect, the information message may be transmitted aperiodically.

An aspect of the disclosure provides for a computer-readable medium of a UE storing computer-executable code. The computer-readable medium may include code to receive a message from a base station. The message may indicate a first dedicated resource for downlink transmission, and the first dedicated resource may be associated with a scheduled downlink transmission from the base station. The computer-readable medium may include code to determine a second dedicated resource for uplink transmission based on the first dedicated resource for downlink transmission indicated in the message, and the second dedicated resource for uplink transmission may be associated with the scheduled downlink transmission. The computer-readable medium may include code to determine whether to transmit an information message, to be used by the base station for transmitting the scheduled downlink transmission, on the second dedicated resource. In one configuration, the code to determine whether to transmit the information message may include code to measure a channel condition between the UE and the base station before the base station transmits the scheduled downlink transmission associated with the message. The measurement may be triggered based on the reception of the message indicating the first dedicated resource for downlink transmission. In this configuration, the code to determine whether to transmit may further include code to refrain from transmitting the information message to the base station if the UE expects to be able to decode a current MCS used by the base station, the UE does not expect to be able to decode the current MCS used by the base station if a transmission power used by the base station is decreased beyond a threshold, the UE does not expect to decode a greater MCS. In another configuration, the computer-readable medium may include code to transmit the information message to the base station on the second dedicated resource before the base station transmits the scheduled downlink transmission. In another aspect, the information message may include a transmit power or a transmit power correction factor. The transmit power or the transmit power correction factor may be based on a channel condition between the UE and the base station. In another aspect, the information message may include an MCS index or an MCS index correction factor. The MCS index or the MCS index correction factor may be based on a channel condition between the UE and the base station. In another aspect, the information message may include a channel measurement report that includes a CQI or a CQI correction factor associated with a known CQI. The CQI or the CQI correction factor may be based on a channel condition between the UE and the base station. In another aspect, the information message may include a reference signal. In another configuration, the computer-readable medium may include code to receive the scheduled downlink transmission from the base station. The scheduled downlink transmission may be received based on the information message transmitted to the base station using the second dedicated resource or is received based on a previously transmitted information message. In another aspect, the information message may be transmitted aperiodically.

In another aspect of the disclosure, a method, a computer-readable medium, and an apparatus are provided. The apparatus may be a base station. The apparatus may transmit a message to a UE. The message may indicate a first dedicated resource for downlink transmission, and the first dedicated resource may be associated with a scheduled downlink transmission to the UE. The apparatus may receive an information message from the UE on a second dedicated resource for uplink transmission that is based on the first dedicated resource for downlink transmission. The information message may be used for transmitting the scheduled downlink transmission that was scheduled before the information message was received. The apparatus may transmit the scheduled downlink transmission after receiving the information message from the UE, and the transmission may be based on the received information message.

Another aspect of the disclosure provides an apparatus for wireless communication. The apparatus may include means for transmitting a message to a UE. The message may indicate a first dedicated resource for downlink transmission, and the first dedicated resource may be associated with a scheduled downlink transmission to the UE. The apparatus may include means for receiving an information message from the UE on a second dedicated resource for uplink transmission that is based on the first dedicated resource for downlink transmission. The information message may be used for transmitting the scheduled downlink transmission that was scheduled before the information message was received. The apparatus may include means for transmitting the scheduled downlink transmission after receiving the information message from the UE. The transmission may be based on the received information message. In an aspect, the information message may include an absolute value or a correction factor, and wherein the absolute value or the correction factor is associated with one of a CQI, a transmission power, or an MCS index. In one configuration, the means for transmitting may be configured to adjust a transmission power for the scheduled downlink transmission based on the received information message. In another configuration, the means for transmitting may be configured to select an MCS for the scheduled downlink transmission based on the received information message. In another aspect, the information message may be received from the UE aperiodically. In another aspect, the message may indicate the first dedicated resource for downlink transmission is a request for feedback to the UE, wherein the feedback is used to adjust transmission parameters of the scheduled downlink transmission that was scheduled before the request for feedback was transmitted.

Another aspect of the disclosure provides for a computer-readable medium of a base station storing computer executable code. The computer-readable medium may include code to transmit a message to a UE. The message may indicate a first dedicated resource for downlink transmission, and the first dedicated resource may be associated with a scheduled downlink transmission to the UE. The computer-readable medium may include code to receive an information message from the UE on a second dedicated resource for uplink transmission that is based on the first dedicated resource for downlink transmission. The information message may be used for transmitting the scheduled downlink transmission that was scheduled before the information message was received. The computer-readable medium may include code to transmit the scheduled downlink transmission after receiving the information message from the UE. The transmission may be based on the received information message. In an aspect, the information message may include an absolute value or a correction factor. The absolute value or the correction factor may be associated with one of a CQI, a transmission power, or an MCS index. In another configuration, the code to transmit may include code to adjust a transmission power for the scheduled downlink transmission based on the received information message. In another configuration, the code to transmit may include code to selecting an MCS for the scheduled downlink transmission based on the received information message. In another aspect, the information message may be received from the UE aperiodically. In another aspect, the message indicating the first dedicated resource for downlink transmission may be a request for feedback to the UE, and the feedback may be used to adjust transmission parameters of the scheduled downlink transmission that was scheduled before the request for feedback was transmitted.

DETAILED DESCRIPTION

Figure 1:
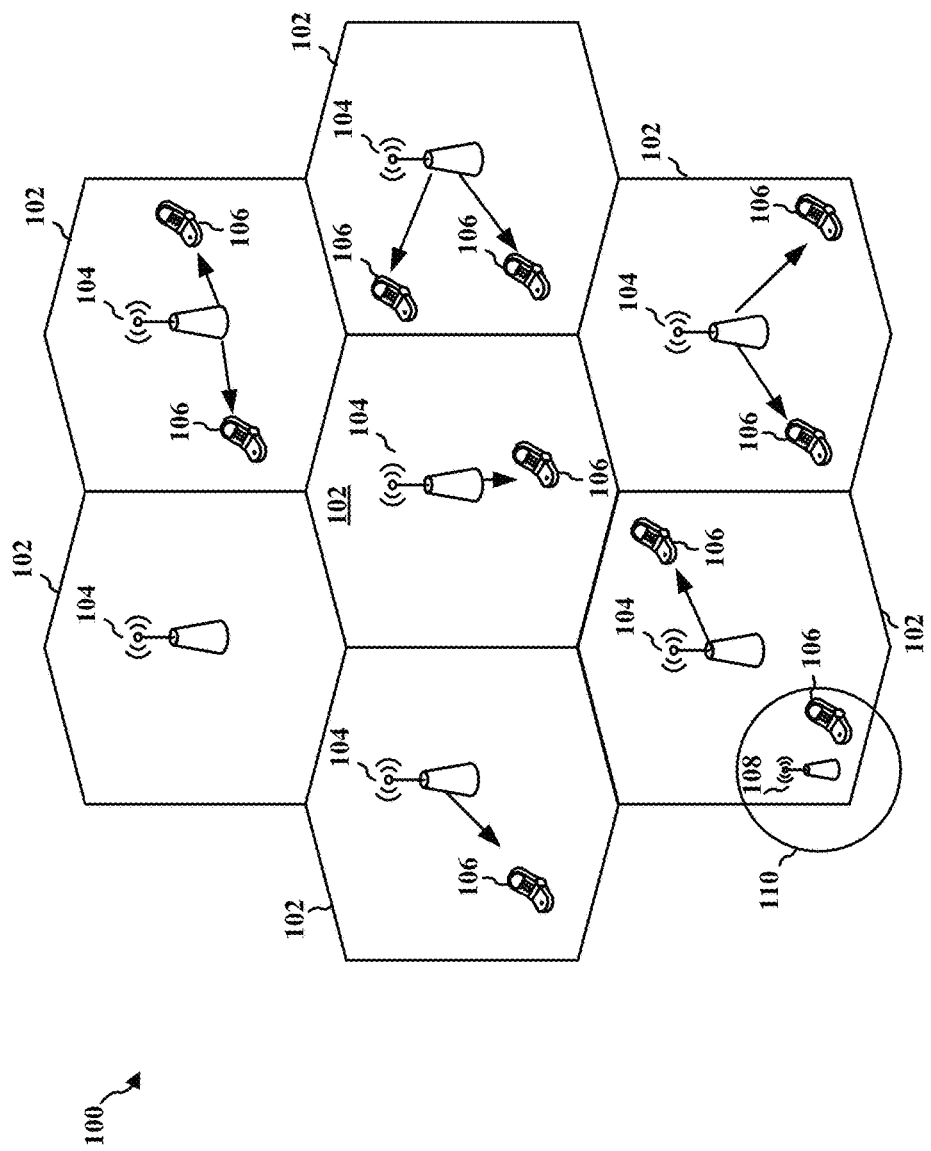
FIG. 1 is a diagram illustrating an example of an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

FIG. 1 is a diagram illustrating an example of an access network 100. In this example, the access network 100 is divided into a number of cellular regions (cells) 102. One or more lower power class evolved Node Bs (eNBs) 108 may have cellular regions 110 that overlap with one or more of the cells 102. The lower power class eNB 108 may be a femto cell (e.g., home eNB (HeNB)), pico cell, micro cell, or remote radio head (RRH). The macro eNBs 104 are each assigned to a respective cell 102 and are configured to provide an access point to the Evolved Packet Core for all the UEs 106 in the cells 102. There is no centralized controller in this example of an access network 100, but a centralized controller may be used in alternative configurations. The eNBs 104 are responsible for all radio related functions including radio bearer control, admission control, mobility control, scheduling, security, and connectivity to a serving gateway. An eNB may support one or multiple (e.g., three) cells (also referred to as a sectors). The term "cell" can refer to the smallest coverage area of an eNB and/or an eNB subsystem serving a particular coverage area. Further, the terms "eNB," "base station," and "cell" may be used interchangeably herein.

The modulation and multiple access scheme employed by the access network 100 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques in other wireless wide area networks (WWANs). By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 104 may have multiple antennas supporting MIMO technology. The use of MIMO technology enables the eNBs 104 to exploit the spatial domain to support spatial multiplexing, beamforming, and transmit diversity. Spatial multiplexing may be used to transmit different streams of data simultaneously on the same frequency. The data streams may be transmitted to a single UE 106 to increase the data rate or to multiple UEs 106 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 106 with different spatial signatures, which enables each of the UE(s) 106 to recover the one or more data streams destined for that UE 106. On the UL, each UE 106 transmits a spatially precoded data stream, which enables the eNB 104 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 2A:
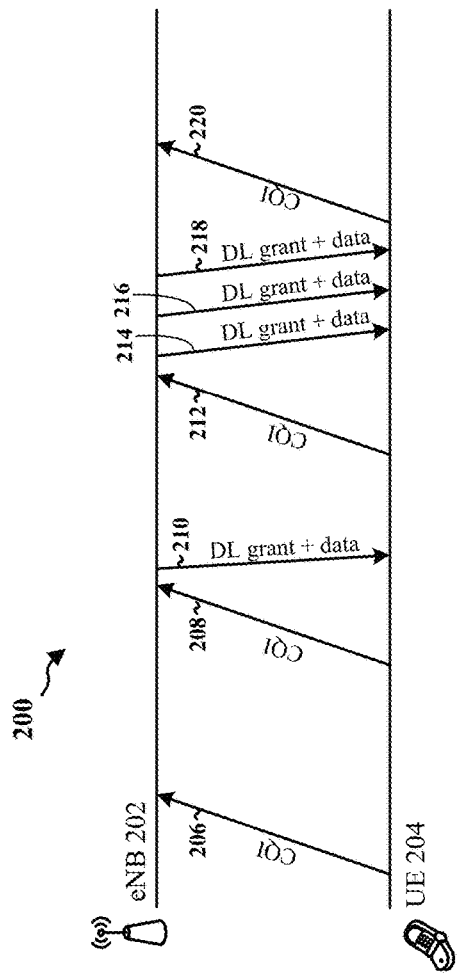
FIG. 2A is a diagram illustrating a method for a UE to periodically provide channel measurement information to a base station.

FIG. 2A is a diagram 200 illustrating a method for a UE to periodically provide channel measurement information to a base station. As shown in the diagram 200, a UE 204 periodically transmits CQIs 206, 208, 212, 220 to an eNB 202 (or any other base station) to estimate downlink channel quality and a signal-to-interference-plus noise ratio (SINR) at the UE 204. In an aspect, the UE 204 may report the CQI on-demand to the eNB 202. The eNB 202 then uses the CQI information from various UEs (not pictured) to make scheduling decisions (e.g., determining which UE to transmit data to based on received CQIs, selecting a subframe and a resource block to transmit the data, selecting an MCS and other transmission parameters based on the CQI). In FIG. 2A, the CQIs 206, 208, 212, 220 are transmitted regardless of whether downlink data is expected from the eNB 202. That is, the CQI transmission is not scheduled with or associated with any downlink data transmissions. For example, when the UE 204 transmits the CQI 206, the UE 204 does not expect to receive any data from the eNB 202. The UE 204 may transmit the CQI 208 based on periodic scheduling of CQI transmission. When the CQIs 206, 208 are transmitted, the UE 204 does not know that any downlink transmissions are scheduled because the UE 204 has not received any downlink grants. When the eNB 202 has data to transmit, the eNB 202 may determine to transmit the first downlink grant/data 210 to the UE 204. Subsequently, the UE 204 may transmit the CQI 212 based on the periodic CQI transmission scheduling. The eNB 202 may have additional data for the UE 202 and transmit the second, third, and fourth downlink grant/data 214, 216, 218 to the UE 204. The UE 204 may transmit the CQI 220 to the eNB 202 based on periodic CQI transmission scheduling. As illustrated by FIG. 2A, the UE 204 transmits CQI regardless of whether the UE 204 expects to receive data from the eNB 202. Furthermore, although the CQI 212 was transmitted before the second, third, and fourth downlink grant/data 214, 216, 218, if the channel conditions changed in between the second downlink grant/data 214 transmission and the third downlink grant/data 216 transmission, the eNB 202 would have no way to know about or compensate for the change due to the CQI being sent on a periodic basis rather than before each data transmission.

By transmitting CQI information regardless of whether data is expected, wireless devices like the UE 204 may be wasting limited energy such as battery power. In Machine Type Communication and cellular IoT, it is often undesirable to have wireless devices periodically report CQI or transmit reference signals for measuring channel quality at a base station. As such, a need exists to report CQI or other information to be used for downlink transmission shortly (e.g., within 10 ms after the CQI is reported) before each data transmission is expected. By reporting CQI and other information shortly before a data transmission, wireless devices may conserve power and adjust for any unforeseen changes in channel conditions. Furthermore, cellular IoT systems may lack opportunistic or channel-awareness scheduling. A base station in a typical cellular system can use periodic CQI reports to perform opportunistic scheduling. A base station used in cellular IoT systems, however, may transmit data to wireless devices less often. To shorten the ON time for such wireless devices (e.g., preserve battery power), a wireless device may wake up just in time for a data transfer from the base station in a pre-agreed data transmission slot. In such instances, a periodically reported CQI is not useful and may be undesirable. As such, a need exists to enable channel measurement information reporting while conserving device resources.

Figure 2B:
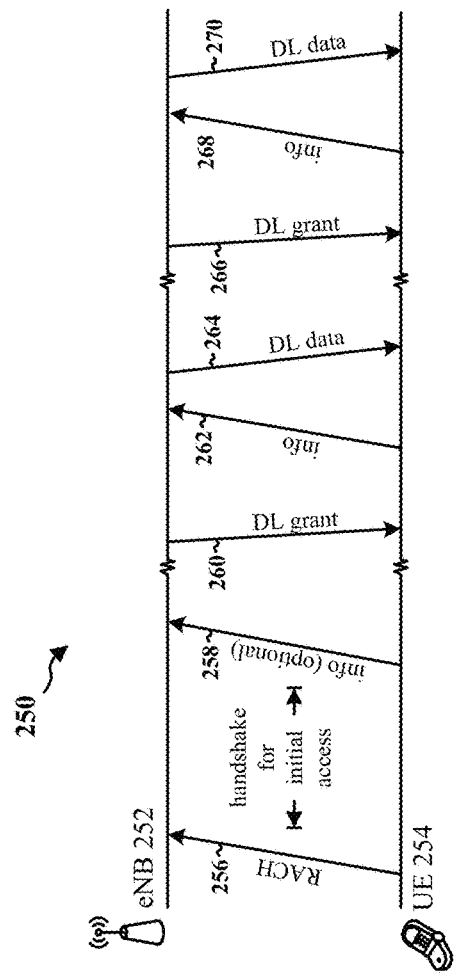
FIG. 2B is a diagram illustrating an exemplary method for a UE to provide information to a base station on a dedicated resource before each scheduled downlink transmission.

FIG. 2B is a diagram 250 illustrating an exemplary method for a UE to provide information to a base station on a dedicated resource before each scheduled downlink transmission. In FIG. 2B, a UE 254 (or any other wireless device) may establish a connection with an eNB 252 (or another type of base station) using a random access channel 256. The UE 254 may perform a handshake with the eNB 252 to establish initial access to the network. In an aspect, the UE 254 may transmit a first (or initial) information message 258 to the eNB 252. The first information message 258 may include channel information (e.g., a CQI) or the first information message 258 may include information (e.g., an MCS index, a transmission power, or a reference signal) to be used by the eNB 252 for transmitting data based on a channel state between the UE 254 and the eNB 252. When the eNB 252 has data to send to the UE 254, the eNB 252 may transmit a first downlink grant 260 (e.g., a downlink control information message) to the UE 254. In an aspect, the first downlink grant 260 may be transmitted on a machine physical downlink control channel (MPDCCH). The first downlink grant 260 may indicate to the UE 254 a first dedicated downlink resource for a first scheduled downlink transmission 264 for the UE 254. The first downlink grant 260 may indicate a request to the UE 254 to perform channel measurements to determine channel conditions in anticipation of the first scheduled downlink transmission 264. That is, the eNB 252 may use the first downlink grant 260 to solicit channel feedback for purposes of modifying the transmission parameters (e.g., MCS, transmit power, etc.) in the first scheduled downlink transmission 264, which was scheduled before the channel information is to be received from the UE 254.

The UE 254 may transmit the channel information/feedback in a dedicated resource for uplink transmission determined based on the first downlink grant 260. In one configuration, the first downlink grant 260 may explicitly indicate the resource dedicated to the UE 254 for uplink transmission of channel information. In another configuration, the first downlink grant 260 may not explicitly indicate the uplink resource but instead may include additional information (e.g., extra bits) that the UE 254 may use to derive the dedicated uplink resource for transmitting the channel information. In an aspect, the dedicated uplink resource may be a hash of the dedicated downlink resource and an offset. In this aspect, the additional information may indicate an offset from the dedicated downlink resource on which to transmit channel information/feedback. For example, if the dedicated downlink resource is located at subframe 8 and the offset is 4 subframes, then the dedicated uplink resource may be located at subframe 4 (e.g., downlink resource−offset=uplink resource). As such, the US 254 may transmit the channel information 4 subframes (or any other number of subframes) before the UE 254 expects to receive the first scheduled downlink transmission 264. In this example, the uplink resource may start at the same tone index as the downlink resource, but in different subframes. In another aspect, the additional information may indicate whether long or short channel information is requested. Long channel information may refer to a greater amount of channel information (e.g., a requested MCS, CQI, transmit power, etc), whereas short channel information may refer to a lesser amount of channel information (e.g., only CQI). In another aspect, the additional information may indicate the MCS to be used for uplink transmission, a transmit power control command for uplink transmission, an amount of resources to be used for uplink transmission (e.g., dependent on an MCS), and an indication of whether to transmit channel feedback. In yet another configuration, the first downlink grant 260 may not explicitly indicate the uplink resource and also may not include additional information related to the uplink resource. In this configuration, the UE 254 may be preconfigured with information needed to determine the uplink dedicated resource based on the indicate downlink resource in the first downlink grant 260. For example, the UE 254 may be preconfigured with an offset value that the UE 254 may use to derive the uplink resource from the downlink resource indicated in the first downlink grant 260.

Upon receiving the first downlink grant 260, the UE 254 may send the channel information in a second information message 262. In an aspect, the second information message 262 may be transmitted in a machine physical uplink shared channel (MPUSCH). The second information message 262 may include information such as a CQI, a transmit power, an MCS index, or a reference signal to be used by the eNB 252 for transmitting the first scheduled downlink transmission 264. The second information message 262 may be enslaved to the data transmission resource used for transmitting the first scheduled downlink transmission 264. As shown in FIG. 2B, the UE 254 transmits the second information message 262 before the eNB 252 transmits the first scheduled downlink transmission 264. In an aspect, the dedicated resource on which the second information message 262 is transmitted may be implicitly inferred from the first downlink grant 260 from the eNB 252 for the first scheduled downlink transmission 264. In another aspect, the dedicated resource may be explicitly indicated by the eNB 252 in the first downlink grant 260.

As previously discussed, when the eNB 252 provides downlink resources to the UE 254 via the first downlink grant 260, the UE 254 may use the dedicated uplink resource implicitly or explicitly indicated in the first downlink grant 260 to send information to the eNB 252. In one aspect, the UE 254 may send a measurement report of channel quality to the eNB 252. The measurement report may be sent in the second information message 262 using the dedicated uplink resource. In this aspect, the UE 254 may measure the downlink channel quality from signals/messages transmitted earlier by the eNB 252. After measuring the downlink channel quality to obtain a measured CQI, for example, the UE 254 may transmit the measured CQI to the eNB 252. In another aspect, instead of sending the actual measured CQI (e.g., an absolute CQI value associated with the channel), the UE 254 may send a CQI correction factor relative to a previous CQI sent in the first information message 258. For example, if the UE 254 transmitted the first information message 258 that indicated a CQI of 9, the UE 254 may transmit a correction factor in the second information message 262 instead of transmitting an entirely new CQI. The UE 254 may indicate that the second information message 262 includes a correction factor by using an indicator bit, for example. That is, when the indicator bit is 0, the second information message 262 may include an absolute CQI value, and when the indicator bit is 1, the second information message 262 may include a CQI correction factor. In one example, the indicator bit may be set to 1, and the UE 254 may indicate that the second information message 262 includes a correction factor of 1. The eNB 252, upon receiving a CQI correction factor of 1, may increase the previously received CQI of 9 and determine a new CQI of 10. In another example, the indicator bit may be set to 1, and the UE 254 may indicate that the second information message 262 includes a correction factor of −1. The eNB 252, upon receiving a CQI correction factor of −1, may decrease the previously received CQI of 9 and determine a new CQI of 8. In another aspect, if the UE 254 did not transmit a CQI in the first information message 258, the indicator bit in the second information message 262 may be set to 0, and the UE 254 may transmit a CQI of 10 in the second information message 262.

In another aspect, the UE 254 may transmit a transmit power that the eNB 252 should use for the first scheduled downlink transmission 264. The transmit power may be transmitted in the second information message 262. The UE 254 may determine the transmit power based on the measured channel quality/condition (e.g., CQI) between the UE 254 and the eNB 252. If the channel conditions are poor (e.g., due to interference from other devices, a long distance between the UE 254 and the eNB 252, or a low SINR), the UE 254 may request or suggest a higher transmit power to the eNB 252. By contrast, if the UE 254 is close to the eNB, the SINR is high, and/or if interference from other devices is low, the UE 254 may request or suggest a lower transmit power to the eNB 252. In an aspect, the UE 254 may transmit an absolute/actual transmit power that the UE 254 wants the eNB 252 to use. In another aspect, the UE 254 may transmit a transmit power correction factor relative to a transmit power of a previous transmission from the eNB 252. The UE 254 may indicate whether the UE 254 is transmitting an absolute transmit power or a transmit power correction factor using an indicator bit as previously discussed. In an aspect, the UE 254 may compute the transmit power or the transmit power correction factor based on the SINR required to decode the MCS indicated in the first downlink grant 260. In another aspect, the eNB 252 may accept the transmit power recommended/requested by the UE 254, or the eNB 252 may determine to use a similar but different transmit power based on the wireless medium conditions (e.g., whether using a high transmit power will cause too much interference).

In another aspect, the UE 254 may transmit an MCS index that the eNB 252 should use. As with the transmit power parameter, the UE 254 may transmit an absolute MCS index (e.g., the actual MCS index) or an MCS index correction factor relative to the MCS index indicated by the eNB 252 in the first downlink grant 260. The MCS index or the MCS index correction factor may be transmitted by the UE 254 in the second information message 262 using the dedicated resource. The UE 254 may determine the MCS index or the MCS index correction based on the measured channel quality/condition between the UE 254 and the eNB 252. If SINR is low, for example, the UE 254 may suggest a lower MCS index or suggest an MCS index correction factor that instructs the eNB 252 to use a lower MCS index for transmitting the first scheduled downlink transmission 264. If SINR is high, the UE 254 may suggest a higher MCS index or suggest an MCS index correction factor that instructs to eNB 252 to increase the MCS index used for transmitting the first scheduled downlink transmission 264. In another aspect, the eNB 252 may select an MCS index that is similar but different from the MCS index suggested by the UE 254. For example, if the UE 254 suggests an MCS index of 15, the eNB 252 may select an MCS index of 14.

In yet another aspect, the UE 254 may transmit a reference signal (e.g., a sounding reference signal) in the dedicated resource indicated by the first downlink grant 260. The reference signal may enable the eNB 252 to estimate the downlink channel quality/conditions. In an aspect, when the UE 254 transmits a reference signal in the second information message 262, the UE 254 may not need to measure the channel quality before transmitting the reference signal. The UE 254 may transmit the reference signal in response to receiving the first downlink grant 260.

After eNB 252 receives the second information message 262 from the UE 254, the eNB 252 may adjust the transmission parameters used for transmitting the first scheduled downlink transmission 264. In an aspect, based on one or more indicators included in the second information message 262, the eNB 252 may determine whether the second information message 262 includes absolute values or correction factors associated with a transmit power, MCS index, etc. For example, if a transmit power or transmit power correction factor was included in the second information message 262, the eNB 252 may adjust the transmit power used for transmitting the first scheduled downlink transmission 264. The eNB 252 may use the transmit power included in the second information message 262, or the eNB 252 may determine a different transmit power based on the transmit power/transmit power correction factor in the second information message 262.

In another example, if an MCS index or an MCS index correction factor was included in the second information message 262, the eNB may select the MCS index (or MCS) based on the MCS index or MCS index correction factor in the second information message 262 for transmitting the first scheduled downlink transmission 264. If the eNB 252 signaled an MCS index in the first downlink grant 260, then the eNB 252 may select a different MCS index than the one signaled in the first downlink grant 260 based on the received second information message 262. In an aspect, the selected MCS index may be different from, but based on, the MCS index or MCS index correction factor signaled in the second information message 262.

In another example, if a CQI is signaled in the second information message 262, the eNB 252 may determine a transmit power and/or an MCS index to use for transmitting the first scheduled downlink transmission 264 based on the channel condition as indicated by the CQI. If the channel quality is poor, the eNB 252 may determine to increase the transmit power and/or lower the MCS index associated with the first scheduled downlink transmission 264. By contrast, if the channel quality is good, the eNB 252 may determine to increase the MCS index and/or lower the transmit power when transmitting the first scheduled downlink transmission 264.

In yet another example, if the second information message 262 includes a reference signal, then the eNB 252 may determine the channel condition between the eNB 252 and the UE 254 based on the reference signal. If the channel quality is good, the eNB 252 may determine to maintain or lower the transmit power associated with the first scheduled downlink transmission 264. In an aspect, the original transmit power may be indicated in the first downlink grant 260. Similarly, if the channel quality is good, the eNB 252 may determine to maintain or increase the MCS index associated with the first scheduled downlink transmission 264.

Subsequently, the UE 254 may receive the first scheduled downlink transmission 264 from the eNB 252. The UE 254 may try to decode the first scheduled downlink transmission 264 using the MCS index contained in the first downlink grant 260. The UE 254 may perform blind decoding for multiple MCSs because the eNB 252 could have modified the MCS for downlink transmission based on the information the eNB 252 received from the UE 254 (e.g., the second information message 262). However, the UE 254 may not know whether the eNB 252 accepted the MCS recommendation from the UE 254. As such, the UE 254 may attempt to decode the first scheduled downlink transmission 264 using one or more MCS indices that the UE 254 expects the eNB 252 to use based on the information transmitted in the second information message 262 (e.g., MCS index).

When the eNB 252 has more data to transmit to the UE 254, the eNB 252 may transmit a second downlink grant 266 to the UE 254. The second downlink grant 266 may be associated with a second scheduled downlink transmission 270. The second downlink grant 266 may indicate either implicitly or explicitly an uplink resource dedicated to the UE 254 for transmitting a third information message 268. In an aspect, the UE 254 may not transmit the third information message 268 if the channel measurement/condition has not changed significantly. For example, the channel condition/measurement may not have changed significantly if the UE 254 expects to be able to decode the existing MCS index being used by the eNB 252 (e.g., the MCS index indicated in the second downlink grant 266), the UE 254 does not expect to be able to decode the same MCS index if transmit power is lowered by an amount greater than a threshold (e.g., greater than 2 dB), and/or the UE 254 does not expect to decode a higher MCS index. By not retransmitting information message unless channel conditions have changed, the UE 254 may further conserve power and resources. If channel conditions have changed sufficiently, however, upon receiving the second downlink grant 266, the UE 254 may transmit the third information message 268 to the UE 254. Upon receiving the third information message 268 from the UE 254, the eNB 252 may adjust a transmit power and/or MCS for transmitting a second scheduled downlink transmission 270.

In sum, the eNB 252 may transmit a downlink grant to the UE 254 that schedules a downlink transmission and also triggers or prompts the UE 254 to perform channel measurements. In response the UE 254 (or any other wireless device) in a cellular IoT system may transmit channel information containing information, recommendations, or instructions to the eNB 252 to be used for downlink transmissions that have already been scheduled before the UE 254 performed channel measurements. Although FIG. 2B shows a limited number of UEs, any number of UEs may use this method. Additionally, while FIG. 2B illustrates 2 scheduled downlink transmissions, any number of downlink transmissions may utilize this method. Also, the UE may transmit multiple pieces of information in the information message (e.g., transmit power correction factor and/or MCS index). Other transmissions parameters besides transmit power and MCS index may also be transmitted to the eNB 252.

Figure 3:
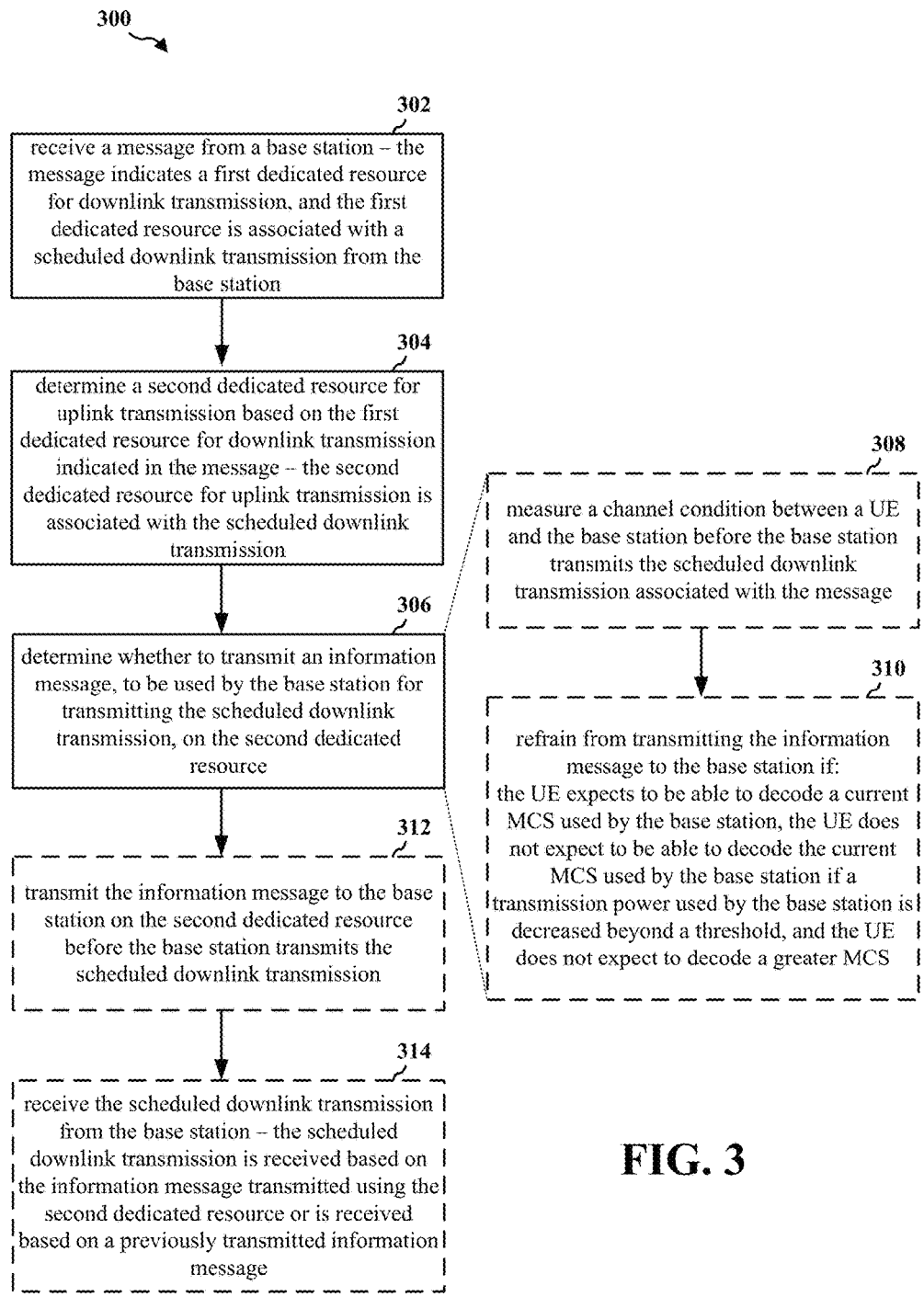
FIG. 3 is a flow chart of a method of wireless communication.

FIG. 3 is a flow chart 300 of a method of wireless communication. The method may be performed by a UE (e.g., the UE 254, the apparatus 502/502' infra). At 302, the UE may receive a message from a base station. The message may indicate a first dedicated resource for uplink transmission, and the dedicated resource may be associated with a scheduled downlink transmission from the base station. For example, referring to FIG. 2B, the UE 254 may receive the first downlink grant 260 from the eNB 252. The first downlink grant 260 may indicate a dedicated resource for downlink transmission, and the dedicated resource is associated with the first scheduled downlink transmission 264 from the eNB 252.

At 304, the UE may determine a second dedicated resource for uplink transmission based on the first dedicated resource for downlink transmission indicated in the message. The second dedicated resource for uplink transmission may be associated with the scheduled downlink transmission. For example, referring to FIG. 2B, the UE 254 may determine the dedicated uplink resource for uplink transmission based on the dedicated downlink resource indicated in the first downlink grant 260. In an aspect, the first downlink grant 260 may include an offset value, and the UE 254 may determine the offset value, determine the resource location of the dedicated downlink resource (e.g., a subframe number) and subtract the offset value from the resource location to obtain the resource location of the dedicated uplink resource.

At 306, the UE may determine whether to transmit an information message, to be used by the base station for transmitting the scheduled downlink transmission, on the second dedicated resource. For example, referring to FIG. 2B, the UE 254 may determine whether to transmit the second information message 262 to be used by the eNB 252 for transmitting the first scheduled downlink transmission 264. The second information message 262 is transmitted on the dedicated uplink resource inferred from the dedicated downlink resource indicated in the first downlink grant 260.

In an aspect, the UE may determine whether to transmit the information message by performing the steps at 308, 310. At 308, the UE may measure a channel condition between a UE and the base station before the base station transmits the scheduled downlink transmission associated with the message. At 310, the UE may refrain from transmitting the information message to the base station if: the UE expects to be able to decode a current MCS used by the base station, the UE does not expect to be able to decode the current MCS used by the base station if a transmission power used by the base station is decreased beyond a threshold, and the UE does not expect to decode a greater MCS. For example, referring to FIG. 2B, assuming the UE 254 transmitted the first information message 258, the UE 254 may determine whether to transmit the second information message 262 by measuring a channel condition between the UE 254 and the eNB 252 before the eNB 252 transmits the first scheduled downlink transmission 264 associated with the first downlink grant 260. The UE 254 will refrain from transmitting the second information message 262 to the eNB 252 if the UE 254 expects to be able to decode the current MCS used by the eNB 252, the UE 254 does not expect to be able to decode the current MCS used by the eNB 252 if a transmission power used by the eNB 252 is decreased beyond 2 dBm, and the UE 254 does not expected to decode a greater MCS. By contrast, if the UE 254 can decode a greater MCS, then the UE 254 may transmit the second information message 262. In another example, the UE 254 may refrain transmitting the third information message 268 after transmitting the second information message 262 if channel conditions have not changed significantly, as previously discussed.

At 312, the UE may transmit the information message to the base station on the second dedicated resource before the base station transmits the scheduled downlink transmission. For example, referring to FIG. 2B, after determining to transmit the second information message 262, the UE 254 may transmit the second information message 262 on the dedicated uplink resource before the eNB 252 transmit the first scheduled downlink transmission 264.

Finally, at 314, the UE may receive the scheduled downlink transmission from the base station. The scheduled downlink transmission is received based on the information message transmitted to the base station using the second dedicated resource or is received based on a previously transmitted information message. For example, referring to FIG. 2B, the UE 254 may receive the first scheduled downlink transmission 264 from the eNB 252. The first scheduled downlink transmission 264 is received based on the second information message 262 transmitted to the eNB 252 using the dedicated uplink resource. In another example, referring to FIG. 2B, the UE 254 may receive the second scheduled downlink transmission 270 from the eNB 252. The second scheduled downlink transmission 270 is received based on the previously transmitted second information message 262. In this example, the UE 254 did not transmit the third information message 268 because the channel conditions/quality did not change significantly.

Figure 4:
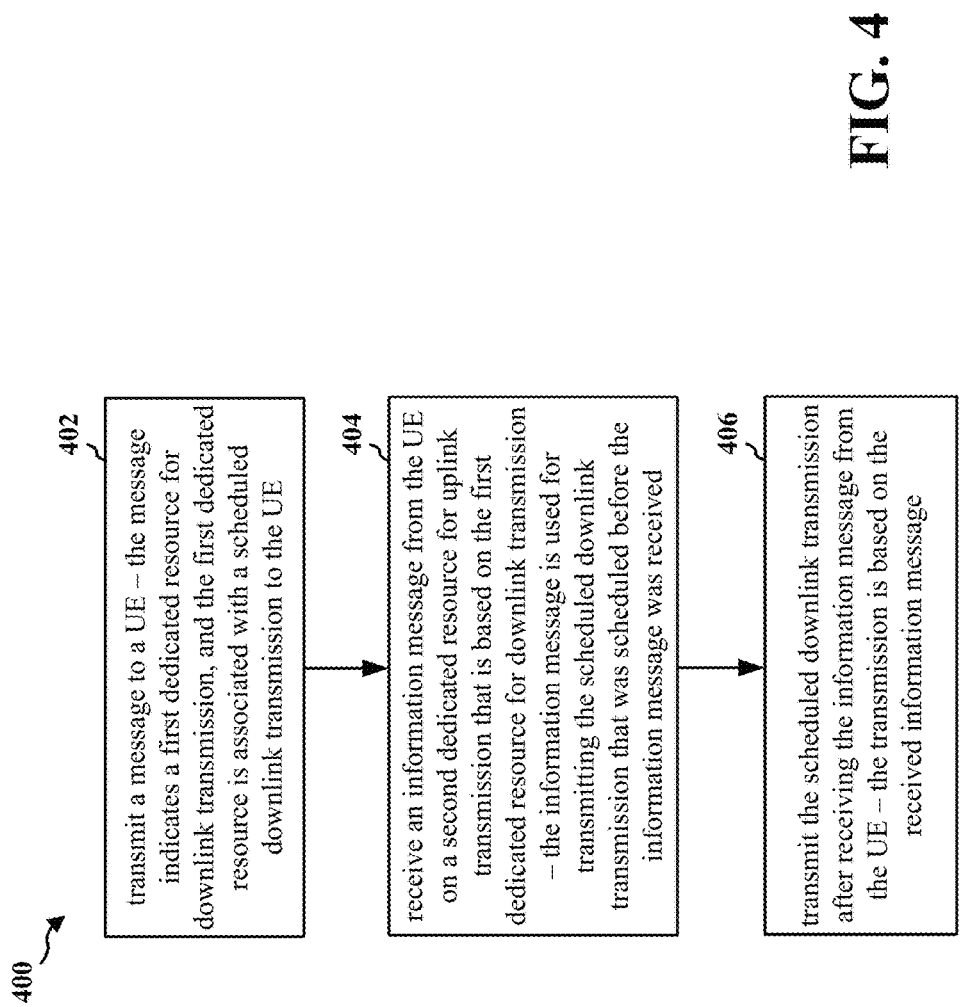
FIG. 4 is a flow chart of a method of wireless communication.

FIG. 4 is a flow chart 400 of a method of wireless communication. The method may be performed by an eNB (e.g., the eNB 252, the apparatus 702/702'). At 402, the eNB may transmit a message to a UE. The message may indicate a first dedicated resource for downlink transmission, and the first dedicated resource may be associated with a scheduled downlink transmission to the UE. For example, referring to FIG. 2B, the eNB 252 may transmit the first downlink grant 260 to the UE 254. The first downlink grant 260 may indicate a dedicated resource for downlink transmission, and the dedicated resource may be associated with the first scheduled downlink transmission 264 to the UE 254.

At 404, the eNB receive an information message from the UE on a second dedicated resource for uplink transmission that is based on the first dedicated resource for downlink transmission. The information message may be used for transmitting the scheduled downlink transmission that was scheduled before the information message was received. For example, referring to FIG. 2B, the eNB 252 receives the second information message 262 from the UE 254 on the dedicated uplink resource. The second information message 262 may be used for by the eNB 252 for transmitting the first scheduled downlink transmission 264, which was scheduled before the second information message 262 was received. The second information message 262 may include an MCS index and/or a transmit power that is used for transmitting the first scheduled downlink transmission 264.

Finally, at 406, the eNB may transmit the scheduled downlink transmission after receiving the information message from the UE. The transmission may be based on the received information message. For example, referring to FIG. 2B, the eNB 252 transmit the first scheduled downlink transmission 264 after receiving the second information message 262 from the UE 254. In example, the eNB 252 may not make any adjustments to the transmit parameters of the first scheduled downlink transmission 264. In another example, if the second information message 262 includes an MCS index correction factor of −1, and assuming the original MCS index 15, the eNB 252 selects an MCS index of 14 (or lower) based on the MCS index correction factor for transmitting the first scheduled downlink transmission 264. In yet another example, if the second information message includes a transmit power, the eNB 252 may adjust the transmission power for the first scheduled downlink transmission 264 based on the transmit power indicated in the second information message 262.

Figure 5:
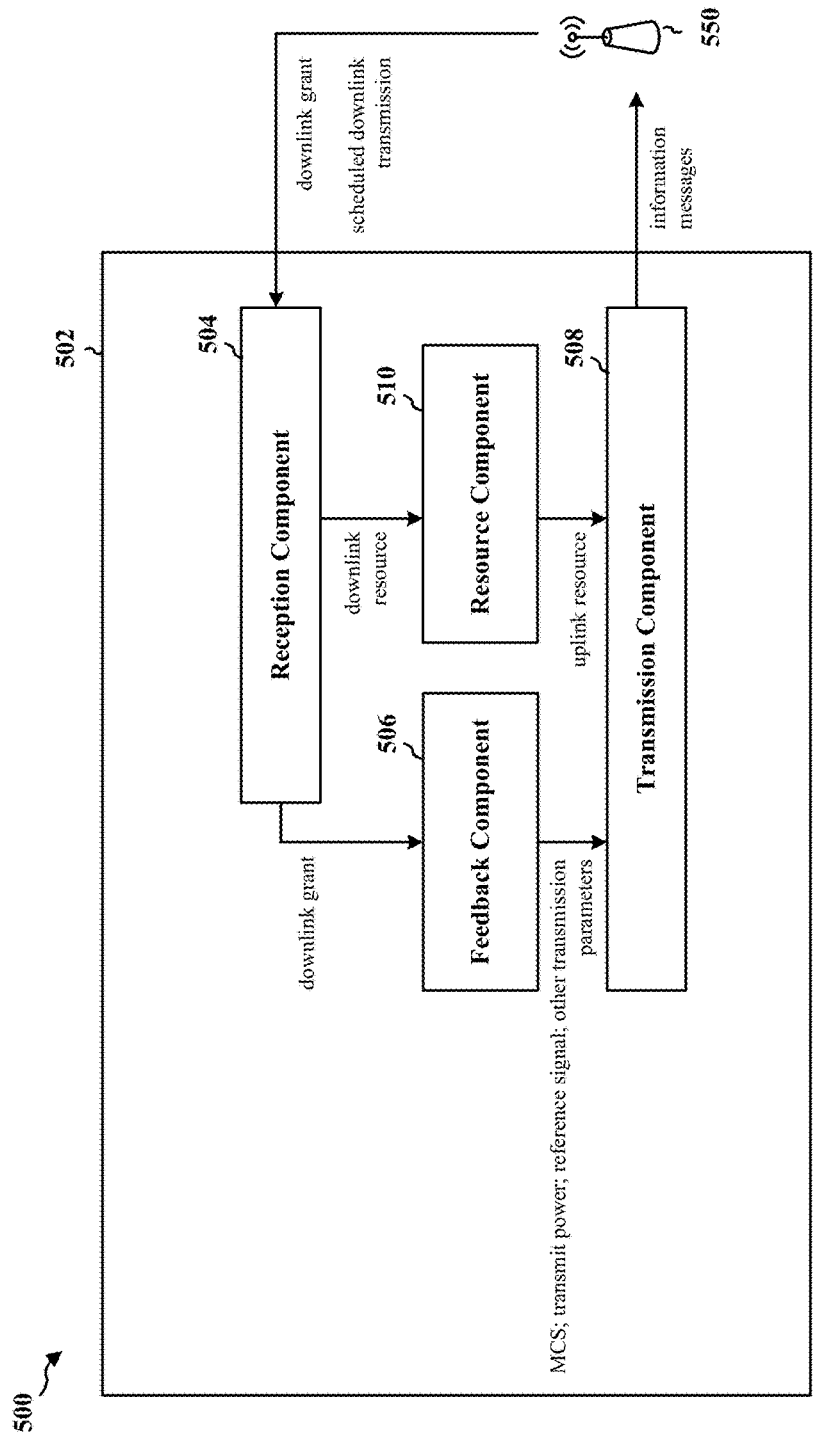
FIG. 5 is a conceptual data flow diagram illustrating the data flow between different modules/means/components in an exemplary apparatus.

FIG. 5 is a conceptual data flow diagram 500 illustrating the data flow between different modules/means/components in an exemplary apparatus 502. The apparatus may be a UE. The apparatus includes a reception component 504, a feedback component 506, a resource component 510, and a transmission component 508. The reception component 504 may be configured to receive a message from a base station 550. The message may indicate a first dedicated resource for downlink transmission, and the first dedicated resource may be associated with a scheduled downlink transmission from the base station 550. The resource component 510 may be configured to determining a second dedicated resource for uplink transmission based on the first dedicated resource for downlink transmission indicated in the message. The second dedicated resource for uplink transmission may be associated with the scheduled downlink transmission. The feedback component 506 may be configured to determine whether to transmit an information message, to be used by the base station 550 for transmitting the scheduled downlink transmission, on the second dedicated resource. In one configuration, the feedback component 506 may be configured to determine whether to transmit the information message by measuring a channel condition between the apparatus and the base station 550 before the base station 550 transmits the scheduled downlink transmission associated with the message, in which the measurement may be triggered based on the reception of the message indicating the first dedicated resource for downlink transmission, and by refraining from transmitting the information message to the base station 550 if the apparatus expects to be able to decode a current MCS used by the base station 550, the apparatus does not expect to be able to decode the current MCS used by the base station 550 if a transmission power used by the base station 550 is decreased beyond a threshold, and the apparatus does not expect to decode a greater MCS. In another configuration, the transmission component 508 may be configured to transmit the information message to the base station 550 on the second dedicated resource before the base station 550 transmits the scheduled downlink transmission. In an aspect, the information message may include a transmit power or a transmit power correction factor. The transmit power or the transmit power correction factor may be based on a channel condition between the apparatus and the base station 550. In another aspect, the information message may include an MCS index or an MCS index correction factor. The MCS index or the MCS index correction factor may be based on a channel condition between the apparatus and the base station 550. In another aspect, the information message may include a channel measurement report that includes a CQI or a CQI correction factor associated with a known CQI. The CQI or the CQI correction factor may be based on a channel condition between the apparatus and the base station 550. In another aspect, the information message may include a reference signal. In another configuration, the transmission component 508 may be configured to receive the scheduled downlink transmission from the base station 550, in which the scheduled downlink transmission may be received based on the information message transmitted to the base station 550 using the second dedicated resource or is received based on a previously transmitted information message. In another aspect, the information message may be transmitted aperiodically.

The apparatus may include additional components that perform each of the blocks of the algorithm in the aforementioned flow charts of FIG. 3. As such, each block in the aforementioned flow charts of FIG. 3 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 6:
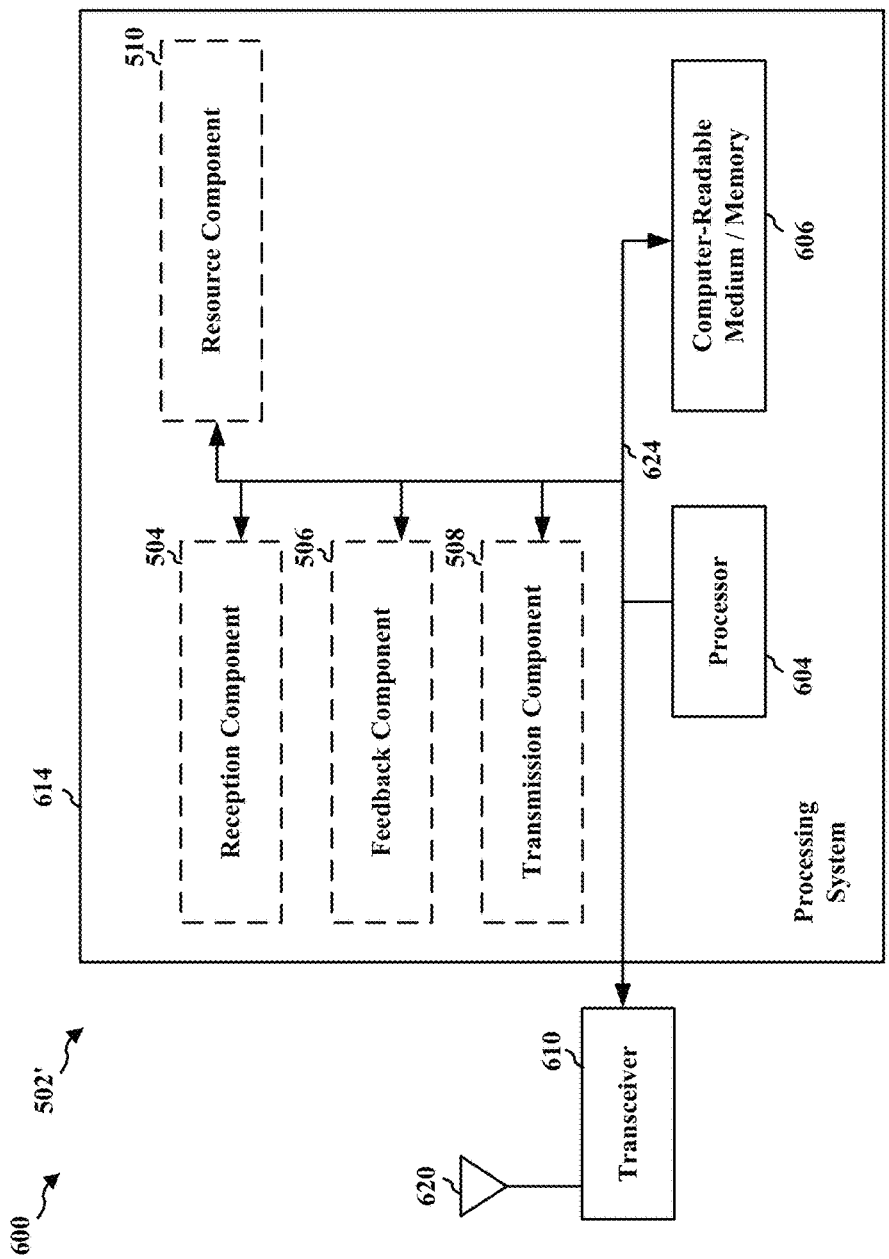
FIG. 6 is a diagram illustrating an example of a hardware implementation for an apparatus employing a processing system.

FIG. 6 is a diagram 600 illustrating an example of a hardware implementation for an apparatus 502' employing a processing system 614. The processing system 614 may be implemented with a bus architecture, represented generally by the bus 624. The bus 624 may include any number of interconnecting buses and bridges depending on the specific application of the processing system 614 and the overall design constraints. The bus 624 links together various circuits including one or more processors and/or hardware components, represented by the processor 604, the components 504, 506, 508, and the computer-readable medium/ memory 606. The bus 624 may also link various other circuits such as timing sources, peripherals, voltage regulators, and power management circuits, which are well known in the art, and therefore, will not be described any further.

The processing system 614 may be coupled to a transceiver 610. The transceiver 610 is coupled to one or more antennas 620. The transceiver 610 provides a means for communicating with various other apparatus over a transmission medium. The transceiver 610 receives a signal from the one or more antennas 620, extracts information from the received signal, and provides the extracted information to the processing system 614, specifically the reception component 504. In addition, the transceiver 610 receives information from the processing system 614, specifically the transmission component 508, and based on the received information, generates a signal to be applied to the one or more antennas 620. The processing system 614 includes a processor 604 coupled to a computer-readable medium/memory 606. The processor 604 is responsible for general processing, including the execution of software stored on the computer-readable medium/memory 606. The software, when executed by the processor 604, causes the processing system 614 to perform the various functions described supra for any particular apparatus. The computer-readable medium/memory 606 may also be used for storing data that is manipulated by the processor 604 when executing software. The processing system further includes at least one of the components 504, 506, 508, 510. The components may be software components running in the processor 604, resident/stored in the computer readable medium/memory 606, one or more hardware components coupled to the processor 604, or some combination thereof.

In one configuration, the apparatus 502/502' for wireless communication includes means for receiving a message from a base station. The message may indicate a first dedicated resource for downlink transmission, and the first dedicated resource may be associated with a scheduled downlink transmission from the base station. The apparatus may include means for determining a second dedicated resource for uplink transmission based on the first dedicated resource for downlink transmission indicated in the message. The second dedicated resource for uplink transmission may be associated with the scheduled downlink transmission. The apparatus may include means for determining whether to transmit an information message, to be used by the base station for transmitting the scheduled downlink transmission, on the second dedicated resource. In another configuration, the means for determining whether to transmit the information message may be configured to measure a channel condition between the apparatus and the base station before the base station transmits the scheduled downlink transmission associated with the message, in which the measurement may be triggered based on the reception of the message indicating the first dedicated resource for downlink transmission, and to refrain from transmitting the information message to the base station if the apparatus expects to be able to decode a current MCS used by the base station, the apparatus does not expect to be able to decode the current MCS used by the base station if a transmission power used by the base station is decreased beyond a threshold, and the apparatus does not expect to decode a greater MCS. In another configuration, the apparatus may include means for transmitting the information message to the base station on the second dedicated resource before the base station transmits the scheduled downlink transmission. In another aspect, the information message may include a transmit power or a transmit power correction factor. The transmit power or the transmit power correction factor may be based on a channel condition between the apparatus and the base station. In another aspect, the information message may include an MCS index or an MCS index correction factor, and the MCS index or the MCS index correction factor may be based on a channel condition between the apparatus and the base station. In another aspect, the information message may include a channel measurement report that includes a CQI or a CQI correction factor associated with a known CQI. The CQI or the CQI correction factor may be based on a channel condition between the apparatus and the base station. In another aspect, the information message may include a reference signal. In another configuration, the apparatus may include means for receiving the scheduled downlink transmission from the base station. The scheduled downlink transmission may be received based on the information message transmitted to the base station using the second dedicated resource or may be received based on a previously transmitted information message. In another aspect, the information message may be transmitted aperiodically. The aforementioned means may be one or more of the aforementioned components of the apparatus 502 and/or the processing system 614 of the apparatus 502' configured to perform the functions recited by the aforementioned means.

Figure 7:
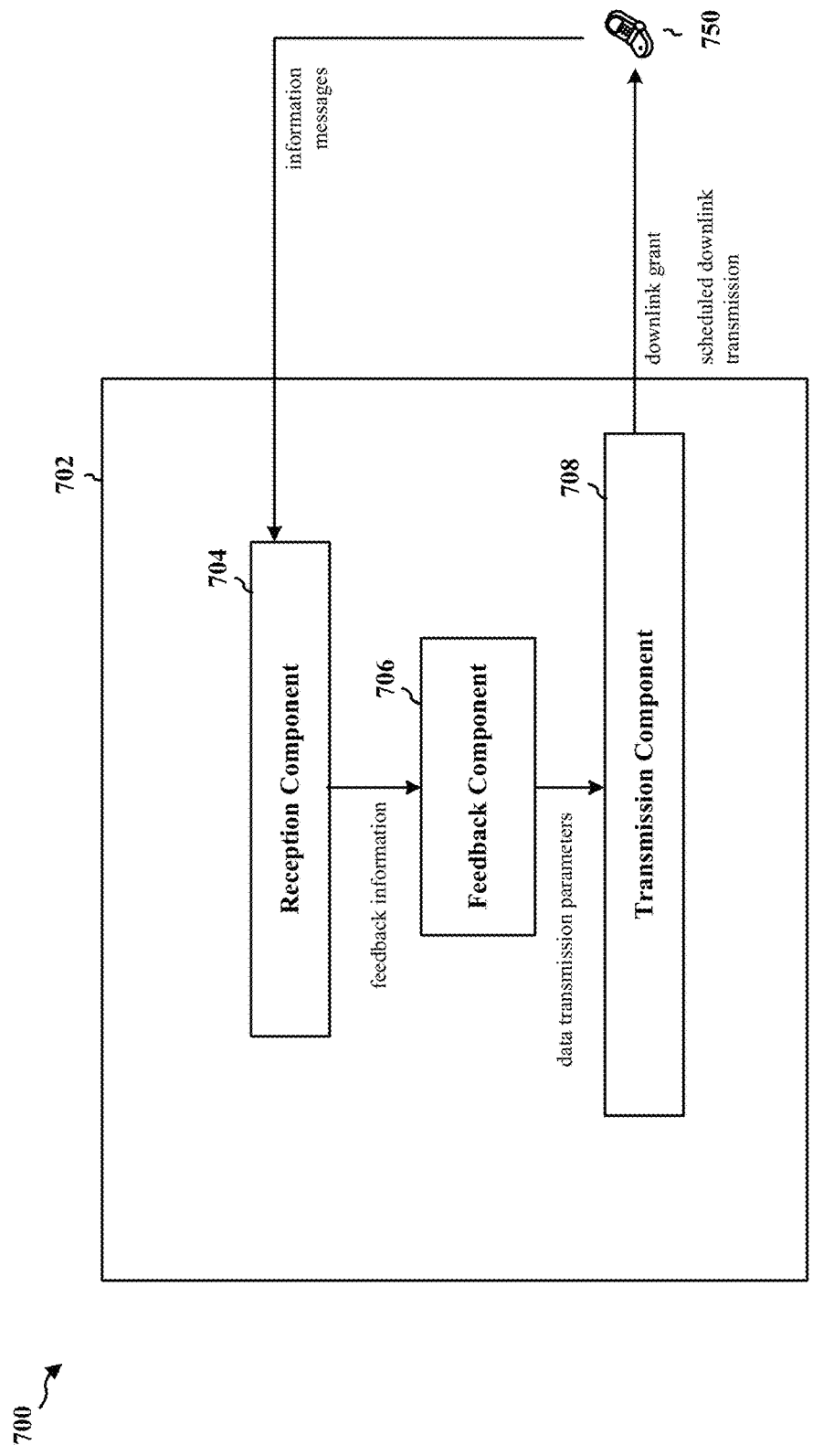
FIG. 7 is a conceptual data flow diagram illustrating the data flow between different modules/means/components in an exemplary apparatus.

FIG. 7 is a conceptual data flow diagram 700 illustrating the data flow between different modules/means/components in an exemplary apparatus 702. The apparatus may be an eNB. The apparatus includes a reception component 704, a feedback component 706, and a transmission component 708. The transmission component 708 may be configured to transmit a message to a UE. The message may indicate a first dedicated resource for downlink transmission, and the first dedicated resource may be associated with a scheduled downlink transmission to the UE. The reception component 704 may be configured to receive an information message from the UE on a second dedicated resource for uplink transmission that is based on the first dedicated resource for downlink transmission. The information message may be used for transmitting the scheduled downlink transmission that was scheduled before the information message was received. The transmission component 708 may be configured to transmit the scheduled downlink transmission after receiving the information message from the UE, and the transmission may be based on the received information message. In an aspect, the information message may include an absolute value or a correction factor, and the absolute value or the correction factor may be associated with one of a CQI, a transmission power, or an MCS index. In another configuration, the transmission component 708 and/or the feedback component 706 may be configured to transmit by adjusting a transmission power for the scheduled downlink transmission based on the received information message. In another configuration, the transmission component 708 and/or the feedback component 706 may be configured to transmit by selecting an MCS for the scheduled downlink transmission based on the received information message. In another aspect, the information message may be received from the UE aperiodically. In another aspect, the message indicating the first dedicated resource for downlink transmission may be a request for feedback to the UE, wherein the feedback is used to adjust transmission parameters of the scheduled downlink transmission that was scheduled before the request for feedback was transmitted.

The apparatus may include additional components that perform each of the blocks of the algorithm in the aforementioned flow charts of FIG. 4. As such, each block in the aforementioned flow charts of FIG. 4 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 8:
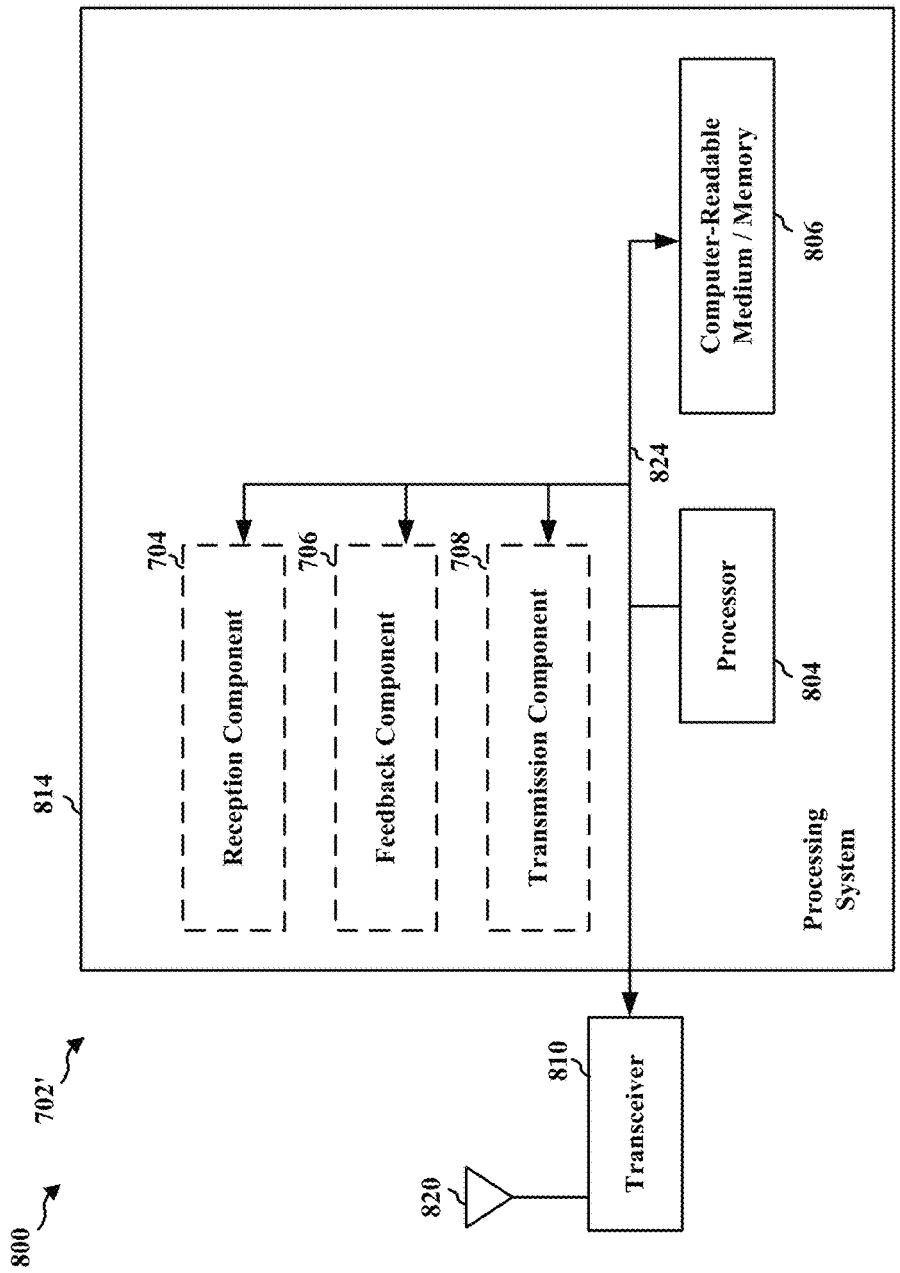
FIG. 8 is a diagram illustrating an example of a hardware implementation for an apparatus employing a processing system.

FIG. 8 is a diagram 800 illustrating an example of a hardware implementation for an apparatus 702' employing a processing system 814. The processing system 814 may be implemented with a bus architecture, represented generally by the bus 824. The bus 824 may include any number of interconnecting buses and bridges depending on the specific application of the processing system 814 and the overall design constraints. The bus 824 links together various circuits including one or more processors and/or hardware components, represented by the processor 804, the components 704, 706, 708, and the computer-readable medium/memory 806. The bus 824 may also link various other circuits such as timing sources, peripherals, voltage regulators, and power management circuits, which are well known in the art, and therefore, will not be described any further.

The processing system 814 may be coupled to a transceiver 810. The transceiver 810 is coupled to one or more antennas 820. The transceiver 810 provides a means for communicating with various other apparatus over a transmission medium. The transceiver 810 receives a signal from the one or more antennas 820, extracts information from the received signal, and provides the extracted information to the processing system 814, specifically the reception component 704. In addition, the transceiver 810 receives information from the processing system 814, specifically the transmission component 708, and based on the received information, generates a signal to be applied to the one or more antennas 820. The processing system 814 includes a processor 804 coupled to a computer-readable medium/memory 806. The processor 804 is responsible for general processing, including the execution of software stored on the computer-readable medium/memory 806. The software, when executed by the processor 804, causes the processing system 814 to perform the various functions described supra for any particular apparatus. The computer-readable medium/memory 806 may also be used for storing data that is manipulated by the processor 804 when executing software. The processing system further includes at least one of the components 704, 706, 708. The components may be software components running in the processor 804, resident/stored in the computer readable medium/memory 806, one or more hardware components coupled to the processor 804, or some combination thereof.

In one configuration, the apparatus 702/702' for wireless communication includes means for transmitting a message to a UE. The message may indicate a first dedicated resource for downlink transmission, and the first dedicated resource may be associated with a scheduled downlink transmission to the UE. The apparatus may include means for receiving an information message from the UE on a second dedicated resource for uplink transmission that is based on the first dedicated resource for downlink transmission. The information message may be used for transmitting the scheduled downlink transmission that was scheduled before the information message was received. The apparatus may include means for transmitting the scheduled downlink transmission after receiving the information message from the UE, and the transmission may be based on the received information message. In an aspect, the information message may include an absolute value or a correction factor, and the absolute value or the correction factor may be associated with one of a CQI, a transmission power, or an MCS index. In another configuration, the means for transmitting may be configured to adjust a transmission power for the scheduled downlink transmission based on the received information message. In another configuration, the means for transmitting may be configured to select an MCS for the scheduled downlink transmission based on the received information message. In another aspect, the information message may be received from the UE aperiodically. In another aspect, the message indicating the first dedicated resource for downlink transmission may be a request for feedback to the UE. The feedback may be used to adjust transmission parameters of the scheduled downlink transmission that was scheduled before the request for feedback was transmitted. The aforementioned means may be one or more of the aforementioned components of the apparatus 702 and/or the processing system 814 of the apparatus 702' configured to perform the functions recited by the aforementioned means.

It is understood that the specific order or hierarchy of blocks in the processes/flow charts disclosed is an illustration of exemplary approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:
1. A method of wireless communication by a base station, comprising:
    transmitting a message to a user equipment (UE), wherein the message indicates a first dedicated resource for downlink transmission, and the first dedicated resource is associated with a scheduled downlink transmission to the UE;

receiving an information message from the UE on a second dedicated resource for uplink transmission that is based on the first dedicated resource for downlink transmission, the information message being used for transmitting the scheduled downlink transmission that was scheduled before the information message was received; and transmitting the scheduled downlink transmission after receiving the information message from the UE, wherein the transmission is based on the received information message.

2. The method of claim 1, wherein the information message includes an absolute value or a correction factor, and wherein the absolute value or the correction factor is associated with one of a channel quality index (CQI), a transmission power, or a modulation and coding scheme (MCS) index.

3. The method of claim 1, wherein the transmitting comprises adjusting a transmission power for the scheduled downlink transmission based on the received information message.

4. The method of claim 1, wherein the transmitting comprises selecting a modulation and coding scheme (MCS) for the scheduled downlink transmission based on the received information message.

5. The method of claim 1, wherein the information message is received from the UE aperiodically.

6. The method of claim 1, wherein the message indicating the first dedicated resource for downlink transmission is a request for feedback to the UE, wherein the feedback is used to adjust transmission parameters of the scheduled downlink transmission that was scheduled before the request for feedback was transmitted.

7. An apparatus for wireless communication, comprising:
a memory; and
at least one processor coupled to the memory and configured to:
transmit a message to a user equipment (UE), wherein the message indicates a first dedicated resource for downlink transmission, and the first dedicated resource is associated with a scheduled downlink transmission to the UE;

receive an information message from the UE on a second dedicated resource for uplink transmission that is based on the first dedicated resource for downlink transmission, the information message being used for transmitting the scheduled downlink transmission that was scheduled before the information message was received; and transmit the scheduled downlink transmission after receiving the information message from the UE, wherein the transmission is based on the received information message.

8. The apparatus of claim 7, wherein the information message includes an absolute value or a correction factor, and wherein the absolute value or the correction factor is associated with one of a channel quality index (CQI), a transmission power, or a modulation and coding scheme (MCS) index.

9. The apparatus of claim 7, wherein the at least one processor is configured to transmit by adjusting a transmission power for the scheduled downlink transmission based on the received information message.

10. The apparatus of claim 7, wherein the at least one processor is configured to transmit by selecting a modulation and coding scheme (MCS) for the scheduled downlink transmission based on the received information message.

11. The apparatus of claim 7, wherein the information message is received from the UE aperiodically.

12. The apparatus of claim 7, wherein the message indicating the first dedicated resource for downlink transmission is a request for feedback to the UE, wherein the feedback is used to adjust transmission parameters of the scheduled downlink transmission that was scheduled before the request for feedback was transmitted.

* * * * *